(12) United States Patent
Files et al.

(10) Patent No.: US 10,228,839 B2
(45) Date of Patent: Mar. 12, 2019

(54) AUTO-SCROLLING INPUT IN A DUAL-DISPLAY COMPUTING DEVICE

(71) Applicant: Dell Products L. P., Round Rock, TX (US)

(72) Inventors: Jace W. Files, Round Rock, TX (US); Preeth K. Srinivasan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 207 days.

(21) Appl. No.: 15/348,119

(22) Filed: Nov. 10, 2016

(65) Prior Publication Data

US 2018/0129391 A1 May 10, 2018

(51) Int. Cl.

| G06F 3/048 | (2013.01) |
|---|---|
| G06F 3/0485 | (2013.01) |
| G06F 1/16 | (2006.01) |
| G06F 17/21 | (2006.01) |
| G09G 5/34 | (2006.01) |
| G06F 17/25 | (2006.01) |
| G06F 3/0488 | (2013.01) |
| G06F 17/24 | (2006.01) |

(52) U.S. Cl.
CPC .......... *G06F 3/0485* (2013.01); *G06F 1/1647* (2013.01); *G06F 3/04883* (2013.01); *G06F 3/04886* (2013.01); *G06F 17/212* (2013.01); *G06F 17/242* (2013.01); *G06F 17/25* (2013.01); *G09G 5/34* (2013.01); *G06F 2203/04803* (2013.01); *G09G 2354/00* (2013.01)

(58) Field of Classification Search
CPC ........ G06F 17/21–17/26; G06F 1/1647; G06F 17/212; G06F 17/242; G06F 17/257; G06F 2203/04803
See application file for complete search history.

(56) References Cited

U.S. PATENT DOCUMENTS

| 7,203,903 B1 * | 4/2007 | Thompson .......... G06F 3/04883 382/187 |
|---|---|---|
| 7,567,239 B2 | 7/2009 | Seni .............................. 345/173 |

(Continued)

OTHER PUBLICATIONS

Knepper, Lawrence E. et al., "Routing Content in a Dual-Display Computing Device"; U.S. Appl. No. 15/334,503, filed Oct. 26, 2016; consisting of Specification, Claims, Abstract, and Drawings (45 pages).

(Continued)

*Primary Examiner* — Claudia Dragoescu
(74) *Attorney, Agent, or Firm* — Campbell Stephenson LLP; Shiv S. Naimpally

(57) ABSTRACT

In some implementations, a computing device may include a first display device and a second display device that are both touch sensitive devices. An auto-scroll module executing on the computing device may create an input area on at least one of the first display device or the second display device based on an orientation of the computing device. The auto-scroll module may automatically scroll the input area as input is received in the input area. The automatic scrolling may include removing a portion of the input being displayed in the input area, recognizing text in the portion of the input, and displaying the text in a text area of a window associated with an application.

20 Claims, 11 Drawing Sheets

(56) References Cited

U.S. PATENT DOCUMENTS

| | | | |
|---|---|---|---|
| 8,108,016 B2 | 1/2012 | Gaddy | 16/223 |
| 8,749,484 B2 | 6/2014 | de Paz | 345/156 |
| 8,801,196 B2 | 8/2014 | Sawada et al. | 353/94 |
| 8,872,731 B2 | 10/2014 | Gimpl | 345/1.3 |
| 8,963,857 B2 | 2/2015 | Kim et al. | 345/173 |
| 9,013,368 B1 | 4/2015 | Kim et al. | 345/1.1 |
| 9,250,851 B2 | 2/2016 | Lu | |
| 9,348,497 B2 | 5/2016 | Miyano | 345/173 |
| 2002/0126126 A1 | 9/2002 | Baldwin | 345/557 |
| 2003/0210817 A1* | 11/2003 | Hullender | G06K 9/222 |
| | | | 382/187 |
| 2004/0153974 A1* | 8/2004 | Walker, Jr. | G06F 9/543 |
| | | | 715/210 |
| 2006/0139295 A1 | 6/2006 | Eberhard | 345/101 |
| 2007/0222742 A1 | 9/2007 | Kimura | 345/102 |
| 2008/0094412 A1 | 4/2008 | Jiao | 345/621 |
| 2008/0129712 A1 | 6/2008 | Van Nguyen | 345/179 |
| 2008/0238336 A1 | 10/2008 | Peng | 315/294 |
| 2009/0262079 A1 | 10/2009 | Bury | 356/169 |
| 2012/0081400 A1 | 4/2012 | Schrock | 345/649 |
| 2012/0208092 A1 | 8/2012 | Ku et al. | 345/173 |
| 2012/0280924 A1* | 11/2012 | Kummer | H04M 1/0235 |
| | | | 345/173 |
| 2013/0076678 A1* | 3/2013 | Kretz | G06F 3/1438 |
| | | | 345/173 |
| 2013/0314362 A1* | 11/2013 | Miyano | G06F 3/04883 |
| | | | 345/173 |
| 2013/0328878 A1 | 12/2013 | Stahl | 345/428 |
| 2013/0332642 A1 | 12/2013 | Capezza | 710/304 |
| 2014/0092107 A1 | 4/2014 | Ferry | 345/520 |
| 2015/0067489 A1 | 3/2015 | Zotto | 715/268 |
| 2015/0193141 A1* | 7/2015 | Goldsmith | G06F 3/04883 |
| | | | 345/173 |
| 2016/0182924 A1 | 6/2016 | Todd | 725/116 |
| 2016/0274722 A1 | 9/2016 | Putzolu | |
| 2016/0321969 A1 | 11/2016 | Kambhatla | |
| 2017/0372680 A1* | 12/2017 | Takashimada | G09G 5/26 |
| 2018/0113666 A1 | 4/2018 | Knepper et al. | 345/659 |

OTHER PUBLICATIONS

Siebert, Philip M., et al., "Automatically Modifying an Input Area Based on a Proximity to Oneo More Edges"; U.S. Appl. No. 15/352,826, filed Nov. 16, 2016; consisting of Specification, Claims, Abstract, and Drawings (38 pages).

Files, Jace W. et al., "Backlight Compensation for a Computing Device with Two or More Display Devices"; U.S. Appl. No. 15/364,529, filed Nov. 30, 2016; consisting of Specification, Claims, Abstract, and Drawings (43 pages).

* cited by examiner

900 ⇘

```
┌─────────────────────────────────────────────────────────────┐
│  REMOVE A PORTION OF INPUT BEING DISPLAYED IN AN INPUT AREA │
│                            902                              │
└─────────────────────────────────────────────────────────────┘
                              ▼
┌─────────────────────────────────────────────────────────────┐
│        RECOGNIZE TEXT IN THE PORTION THAT WAS REMOVED       │
│                            904                              │
└─────────────────────────────────────────────────────────────┘
                              ▼
┌─────────────────────────────────────────────────────────────┐
│  INSERT (E.G., DISPLAY) THE TEXT IN A TEXT AREA OF A WINDOW │
│                       OF AN APPLICATION                     │
│                            906                              │
└─────────────────────────────────────────────────────────────┘
                              ▼
┌─────────────────────────────────────────────────────────────┐
│ MODIFY A LOCATION WHERE A REMAINING PORTION OF THE INPUT IS │
│                  BEING DISPLAYED IN THE INPUT AREA          │
│                            908                              │
└─────────────────────────────────────────────────────────────┘
```

FIG. 9

AUTO-SCROLLING INPUT IN A DUAL-DISPLAY COMPUTING DEVICE

BACKGROUND OF THE INVENTION

Field of the Invention

This invention relates generally to dual-display devices and, more particularly, to auto-scrolling input received from a stylus used on a computing device that includes two touchscreen display devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When providing input using a stylus on a touchscreen of a computing device, a user may experience frustration as the input area becomes full (e.g., the stylus input is within a predetermined distance of an edge of the input area) because the user then has to scroll (e.g., either left, right, up, or down) to continue providing stylus input. The scrolling may result in the user using two hands (e.g., one hand to provide stylus input and the other hand to scroll), thereby interrupting the flow of input using the stylus.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some implementations, a computing device may include a first display device and a second display device that are both touch sensitive devices. An auto-scroll module executing on the computing device may create an input area on at least one of the first display device or the second display device based on an orientation of the computing device. The auto-scroll module may automatically scroll the input area as input is received in the input area. The automatic scrolling may include removing a portion of the input being displayed in the input area, recognizing text in the portion of the input, and displaying the text in a text area of a window associated with an application.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 9 is a flowchart of a process that includes performing optical character recognition (OCR) on input according to some embodiments.

DETAILED DESCRIPTION

Figure 1:
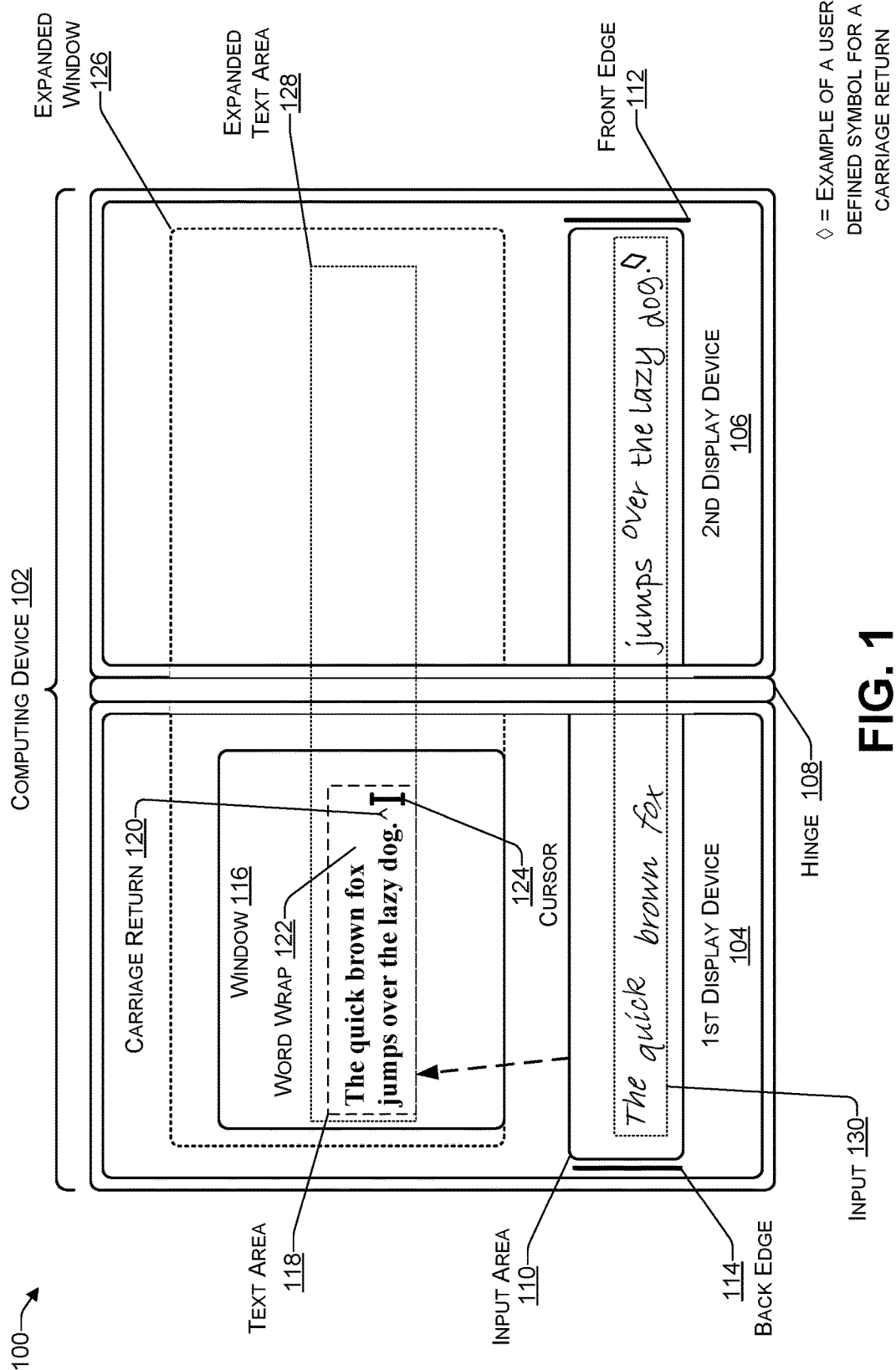
FIG. 1 is a block diagram of an architecture that includes a computing device having an input area that spans two touchscreen display devices according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The system and techniques described herein provide automatic (e.g., without human interaction) scrolling of an input area when, for example, the input area is receiving input from a stylus that is being manipulated by a user. A computing device may have two touch sensitive display devices. In some cases, the computing device may use a single display device that is thin and foldable that uses a technology such as, for example, organic light-emitting diode (OLED) or similar technology, and that can be logically (e.g., virtually) be divided into two display devices. Based on the orientation, an input area may be created that spans either one display device or both display devices. As the user provides input by manipulating a stylus in the input area, the computing device may automatically scroll the input area by one or more characters. The one or more characters may include blank spaces and punctuation characters. Thus, the one or more characters may include at least one character, one or more words, one or more phrases, or one or more sentences. By providing automatic scrolling, the user may be able to continuously provide input using the stylus, without having to pause to manually scroll the input area. While the examples herein use the English language, which features writing that goes from right to left and from up to down, as an example, other languages may be accommodated by modifying the automatic scrolling according to the way in which the language is written. For example, the systems and techniques described herein may be used to accommodate languages that are written from right to left, from bottom to top, or both.

The term stylus refers to an input tool (including a user's appendage, such as a finger) that is used to provide input to touchscreen-enabled devices. The stylus may be used to provide graphical input, such as drawings and handwritten input using cursive input, printed input, or a combination of both printed and cursive. The stylus may be a passive (e.g., capacitive) stylus or an active stylus. A passive stylus may be a finger or behave in a manner similar to a finger when touching a touchscreen, e.g., there may not be electronic communication between the passive stylus and the computing device. An active stylus includes electronic components that communicate with the touchscreen display device. The stylus may incorporate a palm rejection technology that temporarily turns off a multi-touch feature of the touchscreen display, thereby allowing the palm to rest on the touchscreen display while still receiving input from the stylus.

An auto-scroll module (e.g., software module) may interact with (i) an operating system of the computing device and (ii) an application executing on the computing device. For example, the operating system may provide an input area for stylus input. The auto-scroll module may interact with the operating system's input area to automatically scroll input received in the input area. The auto-scroll module may scroll the input area in multiple directions and automatically zoom into or out of the input area. The auto-scroll module may recognize (e.g., using OCR) input received in the input area and insert text into a text area of an application (e.g., a word processing application, a presentation application or other type of application) executing on the computing device. For example, the text may be inserted at the location of a cursor in the text area.

The user may specify a front edge, a back edge, or both a front edge and a back edge of the input area. For example, the user may specify a front edge to avoid providing input past a rightmost edge of one or both of the display devices for languages that are written from left to right. The user may specify a back edge to avoid providing input past a leftmost edge of one or both of the display devices for languages that are written from right to left.

The auto-scroll module may determine whether the stylus input is print input or cursive input. For example, the auto-scroll module may determine that one or more portions of the input are print input while one or more remaining portions of the input are cursive input. The print input may be automatically scrolled one or more characters at a time. The cursive input may be scrolled one word at a time. A word may be one or more characters in length. In some cases, when the input in the input area is within a predetermined distance from the front edge, a line feed may be automatically performed in the input area followed by vertical automatic scrolling to enable the user to continue to enter input.

The auto-scroll module may automatically scroll the input area by removing a character or one or more words from the input area, performing character recognition (e.g., using OCR or a similar technology) to identify text, and inserting the text in a text area of an application executing on the computing device. For example, the text may be inserted at a location of a cursor in the text area.

In some orientations, such as in a vertical (e.g., portrait) dual-display orientation, the input area may span both of the display devices. In such an orientation, the user may provide first input in a left portion of the input area (e.g., located on a left display device), and then may move the stylus to provide second input in a right portion of the input area (e.g., located on a right display device). The auto-scroll module may detect that the user has initiated providing second input in the right portion of the input area and automatically scroll the first input from the input area while the user is providing the second input. The user may create a user preference specifying that the first input in the left portion of the input area is one line of input and the second input in the right portion of the input area is another (e.g., subsequent) line of input. In a tablet orientation or when the display devices are both in a horizontal (e.g., landscape) orientation, the input area may span a single display device. Thus, the auto-scroll module may determine whether the input area spans (i) a single display device or (ii) both display devices based on the orientation of the computing device (e.g., based on the orientation of the display devices).

When the user provides print input, the auto-scroll module may determine an average size of each character, an average time to input each character, or both. The auto-scroll module may determine a rate at which to automatically scroll the input in the input area based on the average size of each character, the average time to input each character, or both. The average size of each character, the average time to input each character, or both may be determined based on an analysis of previously provided input from the user, a running average (e.g., an average of the last N characters that were entered (N>1)), a current average of previously entered characters, or a weighted average of previous input, a running average, and a current average.

When the user provides cursive input, the auto-scroll module may automatically scroll after each word is input, after a predetermined number of characters are input, after a predetermined number of words are input, or any combination thereof. The automatic scrolling of the input area may include automatically scrolling the input area horizontally, automatically scrolling the input area vertically, or both.

The auto-scroll module may compensate for angled input provided in the input area. For example, one or more characters (e.g., characters, words, phrases, or sentences) may not be precisely aligned with the edges of the display devices. To illustrate, one or more characters that have been input may not be parallel to a vertical edge or may not be perpendicular to a horizontal edge of at least one of the display devices. After the auto-scroll module removes one or more characters received in the input area, the auto-scroll module may rotate the one or more characters to be approximately parallel to a vertical edge or approximately perpendicular to a horizontal edge of at least one of the display devices.

The auto-scroll module may automatically (e.g., without human interaction) word-wrap text in the text area of the application. For example, when the text is within a predetermined distance from an edge of the text area, the auto-scroll module may automatically word-wrap the text.

Thus, a computing device may have two touch sensitive display device that are capable of receiving input from a stylus. An auto-scroll module executing on the computing device may create, based on an orientation of the computing device, an input area that spans either one display device or both display devices. As the user provides stylus input in the input area, the auto-scroll module may automatically scroll the input area one or more characters at a time, enabling the user to continuously provide input using the stylus, without having to pause to manually scroll the input area.

FIG. 1 is a block diagram of an architecture 100 that includes a computing device having an input area that spans two touchscreen display devices according to some embodiments. A computing device 102 may include a first display device 104 and a second display device 106. The first display device 104 may be coupled to the second display device 106 using a hinge 108 that enables either of the first display device 104 or the second display device 106 to rotate freely from 0-360° relative to the other display device. The first display device 104 and the second display device 106 may both be touch sensitive display devices that are capable of receiving input using a stylus.

An input area 110 may span (1) the first display device 104, (2) the second display device 106, or (3) both the first display device 104 and the second display device 106. In FIG. 1, the input area 110 is shown as spanning both the first display device 104 and the second display device 106. In some cases, a user may specify a front edge 112 of the input area 110. The front edge 112 may specify how far from the right edge of the second display device 106 the input area 110 is to be positioned. In some cases, the user may specify a back edge 114 identifying how far from the left edge of the first display device 104 the input area 110 is to be positioned. Thus, the front edge 112 and the back edge 114 may enable a user to define a length and a position of the input area 110. In some cases, the front edge 112 may be defined when inputting languages that are written from left to right (e.g., in English, Devanagri, or the like) while the back edge 114 may be defined when inputting languages that are written from right to left (e.g., Jewish script, Arabic script, or the like).

The computing device 102 may automatically scroll the input area 110 as the input 130 is received. For example, a speed at which the computing device 102 automatically scrolls the input area 110 may be based on whether the input 130 is printed or cursive, an average size (e.g., height, width, or both) of each character in the input 130, an average speed at which the input 130 is entered, a distance of the rightmost portion of the input 130 from a rightmost edge of the input area 110 (or from the front edge 112). To illustrate, in response to determining that the rightmost portion of the input 130 is less than a predetermined distance from a rightmost edge of the input area 110 (or from the front edge 112), the computing device 102 may automatically begin scrolling the input 130 from the input area 110.

The window 116 may be displayed on the first display device 104, the second display device 106, or both the display devices 104,106. The window 116 may be associated with an application, such as a word processing application, a web browser application, or another type of application. The window 116 may include a text area 118. As a user provides input 130 to the input area 110 using a stylus or other means, the results of manipulating the stylus in the input area 110 (e.g., one or more characters that have been input using print or cursive) may be displayed in the input area 110. The computing device 102 may use a technique, such as optical character recognition (OCR), to recognize and convert the input 130 into text, and display the text in the text area 118.

In some cases, the computing device 102 may automatically insert a carriage return into the text area 118. For example, the computing device 102 may automatically insert a carriage return into the text area 118 in response to detecting that the user has input a period into the input area 110. The computing device 102 may automatically insert a carriage return into the text area 118 in response to detecting that a user has input a previously defined character or symbol into the input area 110. For example, the user may define a particular symbol or character, such as "◊", and the computing device 102 may automatically insert a carriage return into the text area 118 in response to detecting that the user has input the particular symbol or character in the input area 110. Based on a previously defined user preference, when the input area 110 spans both the display devices 104, 106, the computing device may automatically insert a carriage return into the text area 118 after determining that (1) the input 130 is within a predetermined distance from an edge of the display device on the left (e.g., the first display device 104 in FIG. 1) and (2) the input 130 is within a predetermined distance from an edge of the display device on the right (e.g., the second display device 106 in FIG. 1).

In some cases (e.g., based on a previously defined user preference), the computing device 102 may automatically scroll a portion of the input 130 that is displayed on the display device on the left (e.g., the first display device 104) when the user initiates providing an additional portion of the input 130 on the display device on the right (e.g., the second display device 106). For example, the user may use a stylus to initiate providing the input 130 on the portion of the input area 110 that is on the first display device 104. As the input 130 begins to approach a right edge of the first display device 104, the user may move the stylus to the portion of the input area 110 that is on the second display device 106 and use the stylus to provide an additional portion of the input 130 on the second display device 106. In response to detecting that the stylus input is being received on the portion of the input area 110 on the second display device 106 (e.g., instead of on the portion of the input area 110 on the first display device 104), the computing device 102 may being automatically scrolling the portion of the input area 110 on the first display device 104. As the input 130 begins to approach a right edge of the second display device 106, the user may move the stylus back to the portion of the input area 110 that is on the first display device 104 (which has been automatically scrolled and is thus clear) and use the stylus to provide new input on the first display device 104. The process may then repeat, e.g., a portion of the input area 110 that is not receiving input from the stylus may be automatically scrolled when the user begins providing input on a remaining portion of the input area 110. For example, as the new input begins to approach a right edge of the first display device 106, the user may move the stylus to the portion of the input area 110 that is on the second display device 106 (which has been automatically scrolled and is thus clear) and use the stylus to provide additional input on the second display device 106, and so on.

The computing device 102 may automatically perform word-wrap 122 of the text in the text area 118, as illustrated in FIG. 1. For example, the text in the text area 118 may be wrapped based on a size of the text area 118, a size of the window 116, a distance of a most recently added character to an edge of the text area 118, or any combination thereof. A cursor 124 may be displayed to indicate a location in the text area 118 where new text will be inserted.

In FIG. 1, the window 116 and the text area 118 are shown as being displayed on the first display device 104. The window 116 may be expanded to span both the first display device 104 and the second display device 106 to create an expanded window 126. The text area 118 may be expanded to span both the first display device 104 and the second display device 106 to create an expanded text area 128.

The computing device 102 may compensate for angled input provided in the input area 110. For example, one or more characters (e.g., characters, words, phrases, or sentences) of the input 130 may not be parallel to a vertical edge or may not be perpendicular to a horizontal edge of at least one of the display devices 104, 106. After the computing device removes a portion (e.g., one or more characters) of the input 130 from the input area 110, the computing device 102 may rotate the portion of the input 130 to be approximately parallel to a vertical edge or approximately perpendicular to a horizontal edge of at least one of the display devices 104, 106. The computing device 102 may perform OCR (or another character recognition technique) on the rotated portion of the input 130 to recognize text and insert the text in the text area 118 at the location of the cursor 124.

In some cases, a flexible organic light emitting diode (OLED or similar technology) may be used to create a single display panel that can be folded to create the display devices 104, 106. In a tablet orientation, auto-scroll in which input is scrolled from a first display device to a second display device may be automatically disabled, e.g., the auto-scroll may only occur on the portion of the OLED display that is visible to the user. A single display may be split into two separate display devices based on orientation, based on user preference, or the like. Auto-scrolling may or may not extend to both displays based on the orientation of the computing device 102. For example, auto-scrolling may be performed on a single display device in some orientations (e.g. tablet mode) where one display device is visible to the user. Auto-scrolling may be performed from one of the display devices to the other display device in orientations where both display devices are visible to the user. In addition, the computing device 102 may monitor the input 130 and determine whether the input 130 includes printed text, cursive text, or non-text (e.g., sketch, doodle, graphic, or the like). The computing device 102 may automatically disable auto-scroll in response to determining that the input 130 includes non-text and automatically resume auto-scroll in response to determining that the input 130 includes printed text or cursive text. Thus, the input area 110 may be displayed on the computing device 102. The input area 110 may receive stylus input 130 on either or both of the touchscreen display devices 104, 106. The stylus input 130 may be displayed in the input area 110. The computing device 102 may perform OCR (or a similar technique) on the stylus input 130 received in the input area 110 and place the recognized text in the text area 118. The computing device 102 may automatically perform the word-wrap 122 based on determining that the text is within a predetermined distance from the edge of the text area 118. The computing device 102 may automatically insert the carriage return 120 into the text area 118 based on identifying a user defined symbol in the input 130. For example, the user may define a particular symbol or character in a user profile or user preferences and the computing device 102 may automatically insert a carriage return in the text area 118 in response to the computing device 102 detecting the inclusion of the particular symbol or character in the input 130. The computing device 102 may automatically scroll the input 130 in the input area 110, as described in more detail below in FIGS. 3 and 4.

Figure 2:
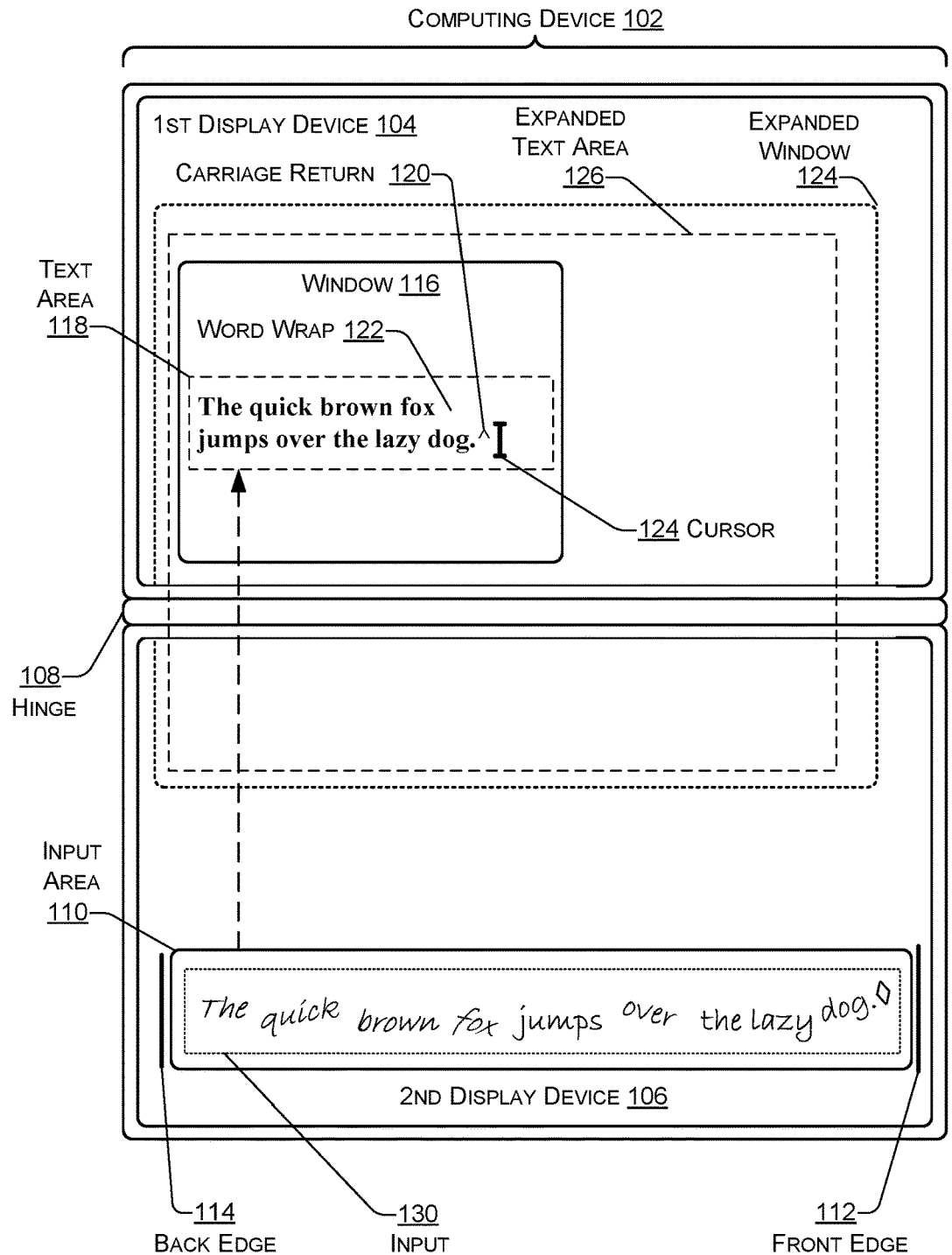
FIG. 2 is a block diagram of an architecture that includes a computing device having an input area that spans one of two touchscreen display devices according to some embodiments.

FIG. 2 is a block diagram of an architecture 200 that includes a computing device having an input area that spans one of two touchscreen display devices according to some embodiments. In FIG. 2, the computing device 102 may be in a horizontal (e.g., landscape) orientation. In the horizontal orientation, the computing device 102 may display the input area 110 across one of either the first display device 104 or the second display device 106, depending on the orientation of the computing device 102. The window 116 may be expanded to create the expanded window 124 that spans both the first display device 104 and the second display device 106. The text area 118 may be located in the window 116. The text area 118 may be expanded to create the expanded text area 126 that spans both the first display device 104 and the second display device 106.

In an orientation (e.g., tablet orientation) in which only one of the display devices 104 or 106 is facing the user, the input area 110, the window 116, and the text area 118 may be displayed on the display device that is facing the user.

Thus, the input area 110 may be displayed on one of the display devices 104, 106 of the computing device 102. The input area 110 may receive the stylus input 130 on one of the touchscreen display devices, such as the second display device 106. The computing device 102 may perform OCR (or a similar technique) on the stylus input 130 received in the input area 110 and place the recognized text in the text area 118. The computing device 102 may automatically perform the word-wrap 122 based on determining that the text is within a predetermined distance from the edge of the text area 118. The computing device 102 may automatically insert the carriage return 120 into the text area 118 based on identifying a user defined symbol in the input 130. The computing device 102 may automatically scroll the input 130 in the input area 110, as described in more detail below in FIGS. 3 and 4.

Figure 3:
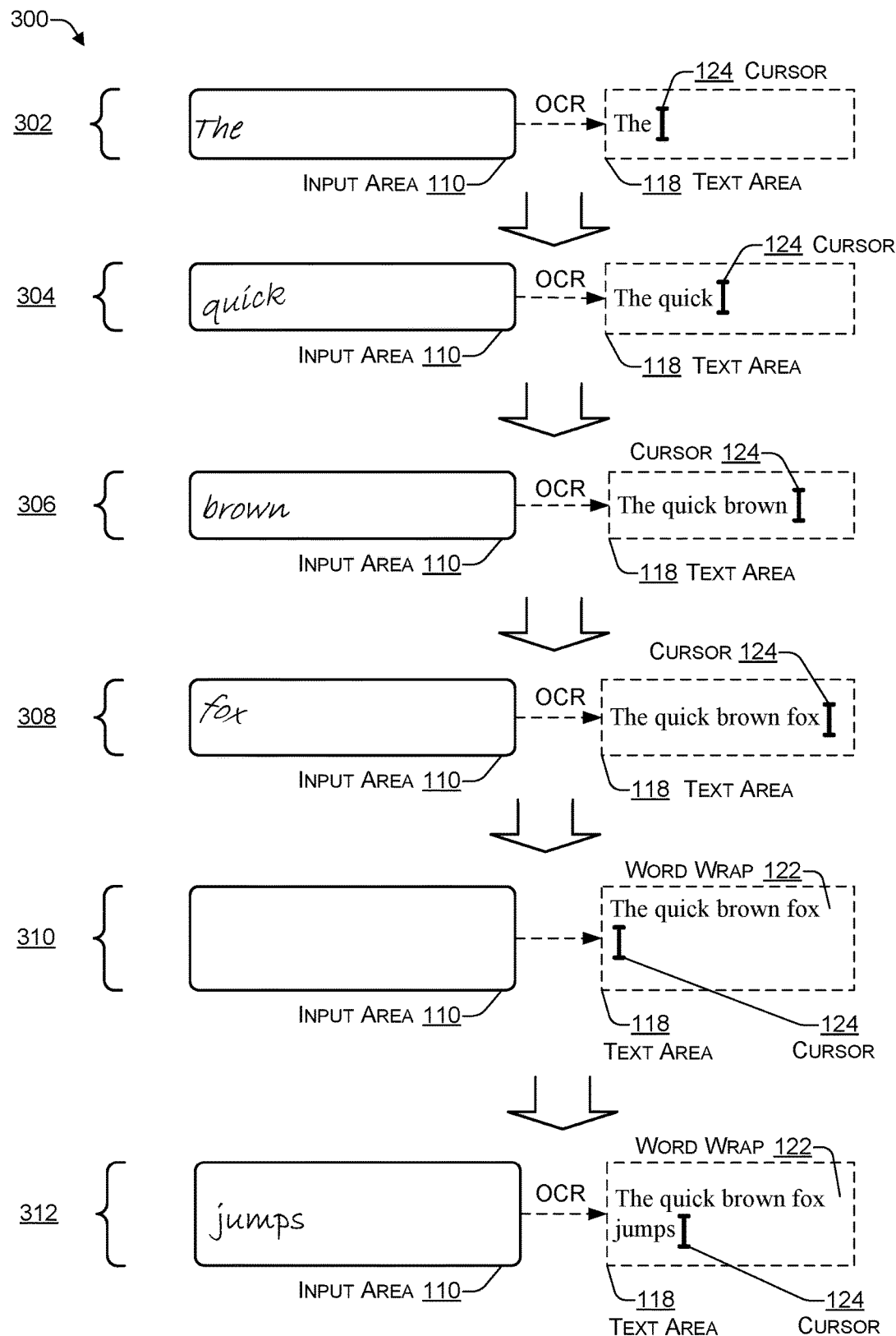
FIG. 3 is a block diagram illustrating automatically scrolling an input area after one or more characters are input according to some embodiments.

FIG. 3 is a block diagram illustrating automatically scrolling an input area after one or more characters are input according to some embodiments. FIG. 3 illustrates how input may be scrolled after one or more characters are input when the user provides either cursive input or printed input. An auto-scroll module executing on the computing device 102 of FIG. 1 may automatically scroll the input area 110 after one or more words have been entered into the input area 110. For example, if the user is providing printed input, the auto-scroll module may automatically scroll the input area 110 after one or more characters have been entered into the input area. If the user is providing cursive input, then the auto-scroll module may automatically scroll the input area 110 after one or more words have been entered into the input area.

The input area 110 may receive cursive input or printed input. If the input entered in the input area 110 is at an angle, the computing device 102 of FIG. 1 may automatically rotate the input to create rotated input. The rotated input may be approximately parallel to a horizontal edge of one of the display devices or perpendicular to a vertical edge of one of the display devices. The computing device 102 of FIG. 1 may use a character recognition technique, such as OCR, to recognize the text characters in the rotated input and insert the corresponding text into the text area 118. Text may be inserted into the text area at approximately where the cursor 124 is being displayed.

For example, at 302, the input area 110 may receive input corresponding to the word "the". The input received in the input area 110 may be either cursive or printed input. The input in the input area 110 may be recognized and the corresponding text, e.g., the letters "the", placed in the text area 118.

At 304, the word "the" from 302 may be automatically scrolled and may no longer be displayed in the input area 110. This enables a user to provide input and have the input in the input area 110 automatically scrolled so that the user does not have to stop and scroll the input area 110 to enter additional input. At 304, the user may enter input corresponding to the letters "quick" in the input area 110. The computing device 102 may perform OCR and insert the letters "quick" in the text area 118 at the location of the cursor 124.

At 306, the word "quick" that was input in the input area at 304 may be automatically scrolled (e.g., removed) from the input area 110. At 306, the input area 110 may receive cursive input or printed input corresponding to the word "brown". The computing device may perform OCR (or another similar technique) and insert the text characters "brown" into the text area 118 (e.g., where the curser 124 is located).

At 308, the word "brown" that was received at 306 may be automatically scrolled (e.g., removed) from the input area 110. At 308, the input area may receive the cursive or printed letters corresponding to the word "fox". The computing device 102 may receive the letters "fox" in the input area 110, perform OCR on the letters, and insert the text characters "fox" into the text area 118 (e.g., where the cursor 124 is located).

At 310, the word "fox" that was received at 308 may be automatically scrolled out of the input area 110 and the input area 110 may receive input corresponding to the letters of the word "jumps". The computing device 102 may perform OCR (or another similar technique) on the input in the input area 110 and insert the text characters "jumps" in the text area 118 (e.g., at the location of the cursor 124). At 310, the computing device 102 may determine that the text in the text area 118 (or the cursor 124) is within a predetermined distance from an edge of the text area 118 and automatically perform the word-wrap 122, causing the cursor 122 to move to the start of a new line.

At 312, the user may provide the input corresponding to the word "jumps" in the input area 110. The computing device may perform OCR on the input in the input area 110 and insert the text characters "jumps" into the text area 118 (e.g., at the location of the cursor 124).

Thus, an auto-scroll module of a computing device may automatically scroll one or more characters received in an input area by removing the one or more characters, rotating the characters to be approximately parallel to a horizontal edge of one of the display devices if the one or more characters are entered at an angle, recognize the one or more characters (e.g., using OCR or a similar technique) to identify text, and insert the text into a text area at the location of a cursor. The auto-scroll module may automatically word-wrap the text in the text area.

Figure 4:
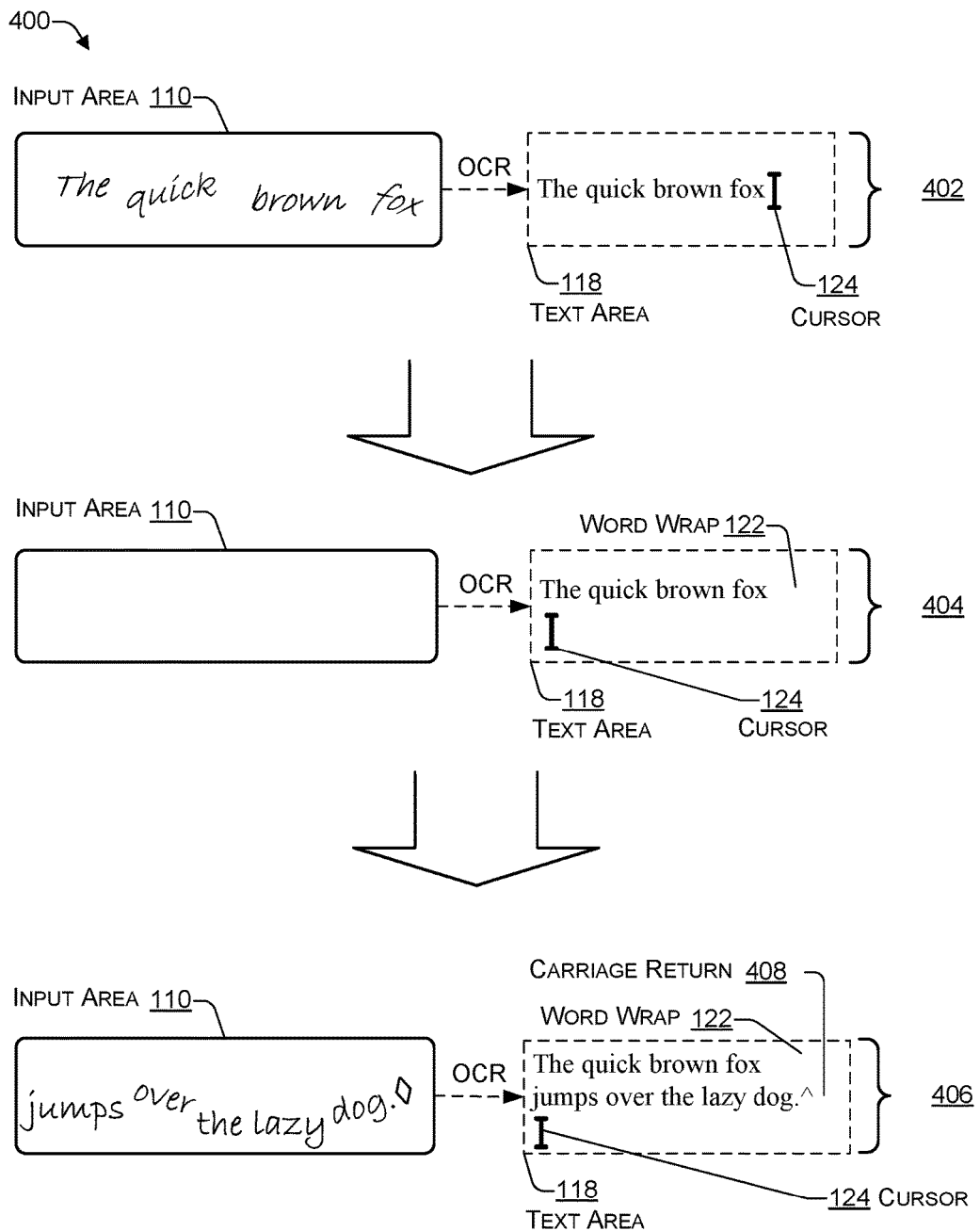
FIG. 4 is a block diagram illustrating automatically scrolling an input area after one or more words are input according to some embodiments.

FIG. 4 is a block diagram 400 illustrating automatically scrolling an input area after one or more words are input according to some embodiments. An auto-scroll module executing on the computing device 102 of FIG. 1 may automatically scroll the input area 110 after one or more words have been entered into the input area 110. For example, if the user is providing printed input, the auto-scroll module may automatically scroll the input area 110 after one or more characters have been entered into the input area. If the user is providing cursive input, then the auto-scroll module may automatically scroll the input area 110 after one or more words have been entered into the input area.

The input area 110 may receive cursive input or printed input. If the input entered in the input area 110 is at an angle, the computing device 102 of FIG. 1 may automatically rotate the input to create rotated input. The rotated input may be approximately parallel to a horizontal edge of one of the display devices or perpendicular to a vertical edge of one of the display devices. The computing device 102 of FIG. 1 may use a character recognition technique, such as OCR, to recognize the text characters in the rotated input and insert the corresponding text into the text area 118. Text may be inserted into the text area at approximately where the cursor 124 is being displayed.

For example, at 402, the input area 110 may receive input corresponding to the words "the quick brown fox", perform OCR on the input, and insert the corresponding text characters "the quick brown fox" in the text area 118 at the location of the cursor 124.

At 404, the input area 110 may be automatically scrolled by removing the input corresponding to the words "the quick brown fox" that was received at 402. The auto-scroll module may determine that the last character of the last word that was inserted into the text area 118 (or a location of the cursor 124) is within a predetermined distance from the edge of the text area 118 and automatically perform a word-wrap 122, thereby moving the cursor 124 to the start of a new line in the text area 118, as illustrated in 404.

At 406, the computing device 102 may receive input corresponding to the words "jumps over the lazy dog" in the input area 110. The auto-scroll module may perform OCR and insert the corresponding text characters "jumps over the lazy dog" into the text area 118 at the approximate location of the cursor 124. The auto-scroll module may determine that the input area 110 includes a period and insert a period into the text area 118.

The user may input a particular symbol (or character) into the input area 110 that the user has previously defined as the symbol (or character) for a carriage return. The auto-scroll module may recognize the previously defined symbol (or character) and automatically insert a carriage return 408 into the text area 118.

The user may input another pre-defined symbol or character that the auto-scroll module recognizes, thereby causing the auto-scroll module to insert another type of formatting character or symbol into the text area 118. For example, the user may input the symbol "¶" in the input area 110, causing the auto-scroll module to start a new paragraph in the text area 118 (e.g., including indenting the paragraph a predetermined distance).

Thus, an auto-scroll module of a computing device may automatically scroll one or more words received in an input area by removing the one or more words, rotating the words to be approximately parallel to a horizontal edge of one of the display devices if the one or more words are entered at an angle, recognize the characters of the words (e.g., using OCR or a similar technique) to identify text, and insert the text into a text area. The text may be inserted into the text area at approximately the location of a cursor. The auto-scroll module may automatically word-wrap the text in the text area. The auto-scroll module may recognize previously defined symbols or characters and insert other formatting into the text area.

Figure 5:
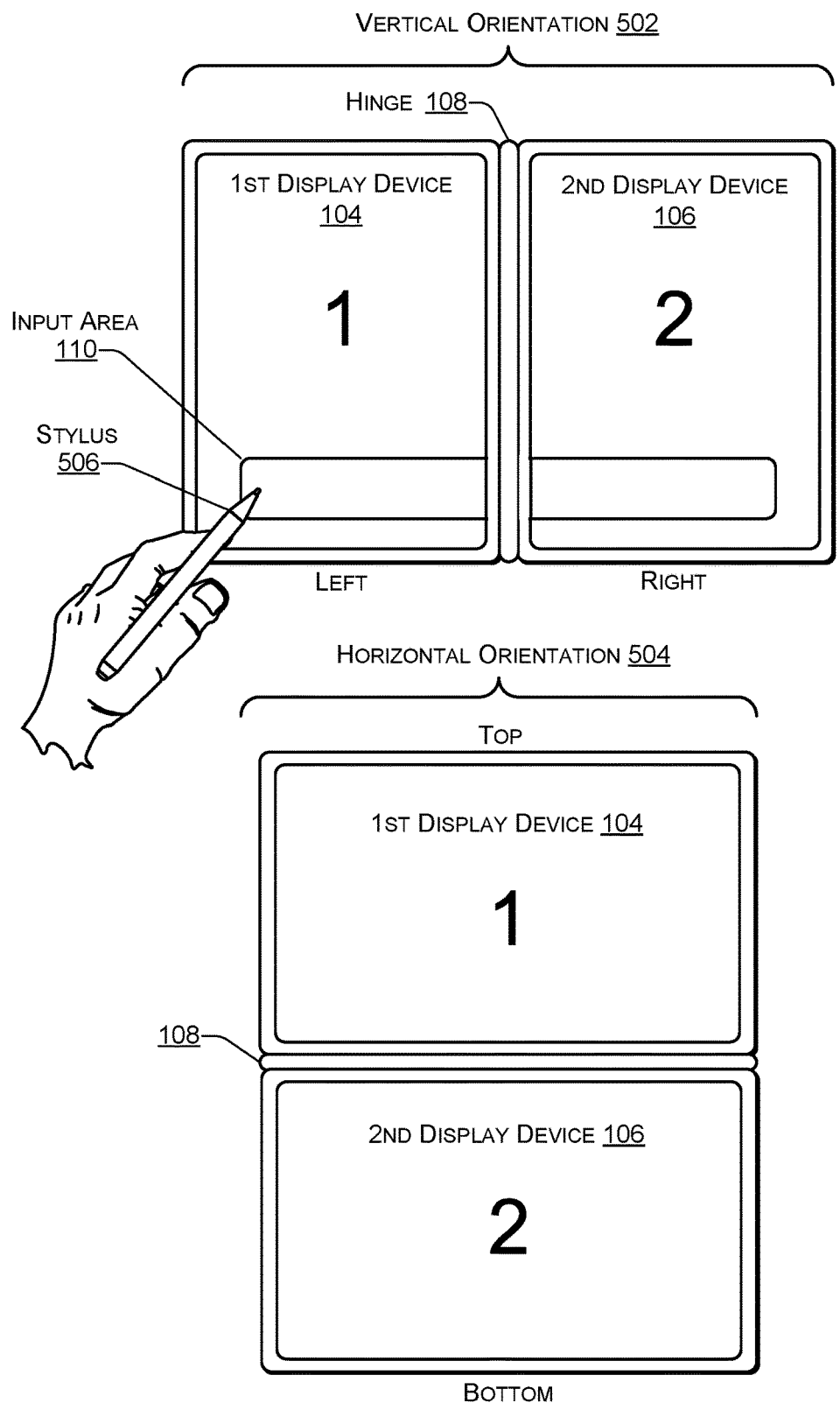
FIG. 5 is a block diagram illustrating a vertical orientation and a horizontal orientation of a dual-display computing device according to some embodiments.
Figure 6:
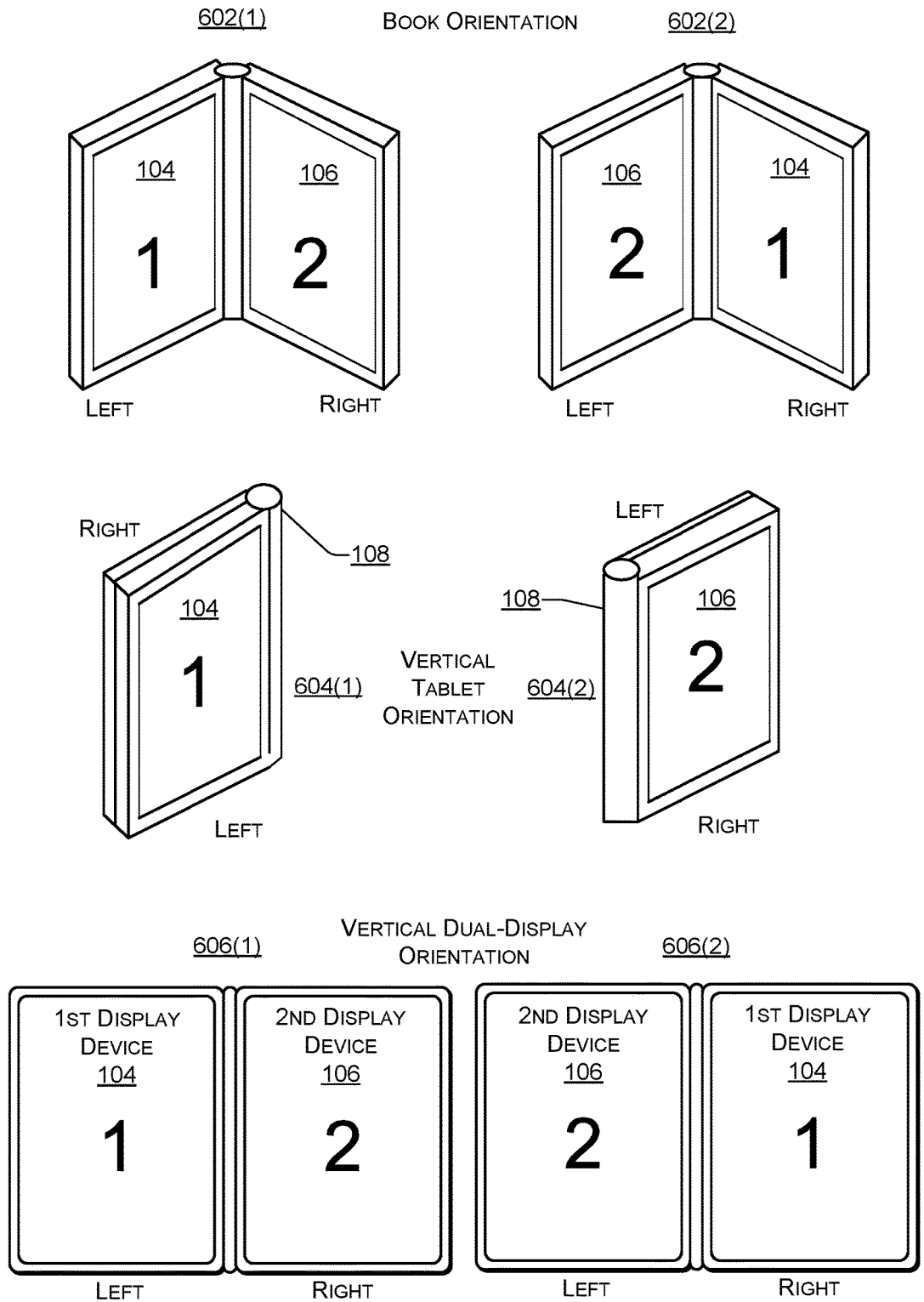
FIG. 6 is a block diagram illustrating different vertical orientations of a dual-display computing device according to some embodiments.

FIG. 5 is a block diagram 500 illustrating a vertical orientation and a horizontal orientation of a dual display computing device according to some embodiments. For example, the computer device 102 may be placed in a vertical orientation 502 in which one of the display devices is positioned on the left and other display device is positioned on the right. As illustrated in FIG. 5, the first display device 104 may be positioned on the left and the second display device 106 may be positioned on the right. Alternately, the first display device 104 may be positioned on the left and the second display device 106 may be positioned on the right. Additional examples of the vertical orientation 502 are illustrated in FIG. 6.

In the vertical orientation, the input area 110 may span both of the display devices 104, 106. The input area 110 may receive input from a stylus 506. The stylus 506 may be a passive (e.g., capacitive) stylus or an active stylus that includes electronic components that communicate (e.g., via Bluetooth® or another wireless technology) with the display devices 104, 106.

Figure 7:
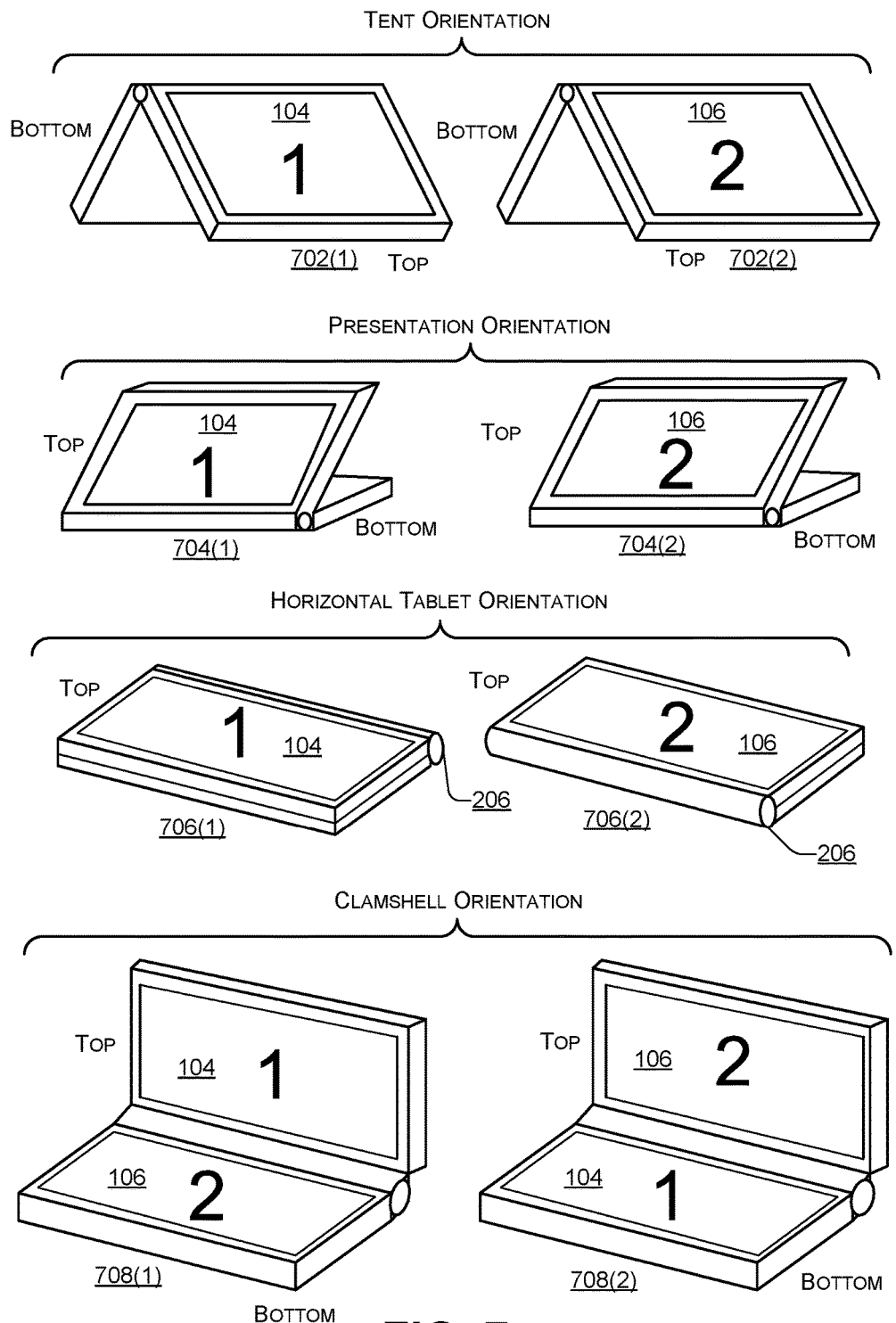
FIG. 7 is a block diagram illustrating different horizontal orientations of a dual display computing device according to some embodiments.

The computing device 102 may be placed in a horizontal orientation 504 wherein one of the display devices is positioned on the top and the other display device is positioned on the bottom. For example, the first display device 104 may be positioned on the top and the second display device 106 may be positioned on the bottom, as illustrated in FIG. 5. Alternately, the second display device 106 may be positioned on the top and the first display device 104 may be positioned on the bottom. Additional examples of the horizontal orientation 502 are illustrated in FIG. 7.

In some cases, input received in a portion of the input area 110 displayed on one of the display devices 104, 106 may be automatically scrolled to a remaining portion of the input area 110 displayed on the other of the display devices 104, 106. For example, the portion of the input area 110 that is being displayed on the second display device 106 may receive input from the stylus 506. The input that is received may be automatically scrolled to a remaining portion of the input area 110 that is being displayed on the first display device 104. In this manner, automatic scrolling may scroll input received on one display device to the other display device.

FIG. 6 is a block diagram 600 illustrating different vertical orientations of a dual-display computing device according to some embodiments. For example, in a book orientation 602(1), the first display device 104 may be on the left and the second display device 106 may be on the right. In a book orientation 602(2), the second display device 106 may be on the left and the first display device 104 may be on the right.

In a vertical tablet orientation 604(1), the first display device 104 may be on the left and facing a use while the second display device 106 may be rotated approximately 360° (e.g., away from the user). In a vertical tablet orientation 604(2), the second display device 106 may be facing the user and the first display device 104 may be rotated approximately 360° (e.g., away from the user).

In a vertical dual display orientation 606(1), the first display device 104 may be on the left and the second display device 106 may be on the right, with both of the display devices 104, 106 on approximately the same plane. In a vertical dual display orientation 606(2), the second display device 106 may be on the left and the first display device 104 may be on the right.

FIG. 7 is a block diagram 700 illustrating different horizontal orientations of a dual display computing device according to some embodiments. For example, in a tent orientation 702(1), the first display device 104 may be positioned at the top (e.g., facing the user) facing the user while the second display device 106 may be positioned at the bottom (e.g., facing away from the user). In the tent orientation 702(2), the second display device 106 may be positioned at the top (e.g., facing the user) and the first display device 104 may be at the bottom (e.g., facing away from the user).

In a presentation orientation 704(1), the first display device 104 may be positioned at the top (e.g., facing the user) while the second display device 106 may be positioned at the bottom, facing down. In the presentation orientation 704(2), the display device 106 may be positioned at the top (e.g., facing the user) while the display device 104 is positioned at the bottom, facing down.

In a horizontal tablet orientation 706(1), the first display device 104 may be positioned on top (e.g., facing the user) while the second display device 106 is positioned at the bottom, facing down (e.g., away from the user). In the horizontal tablet orientation 706(2), the second display device 106 may be positioned at the top (e.g., facing the user) and the first display device 104 may be positioned at the bottom facing down (e.g., away from the user).

In a clam shell orientation 708(1), the first display device 104 may be positioned on the top and the second display device 106 may be positioned at the bottom. In the clam shell orientation 708(2), the second display device may be positioned at the top and the first display device 104 may be positioned at the bottom.

Figure 8:
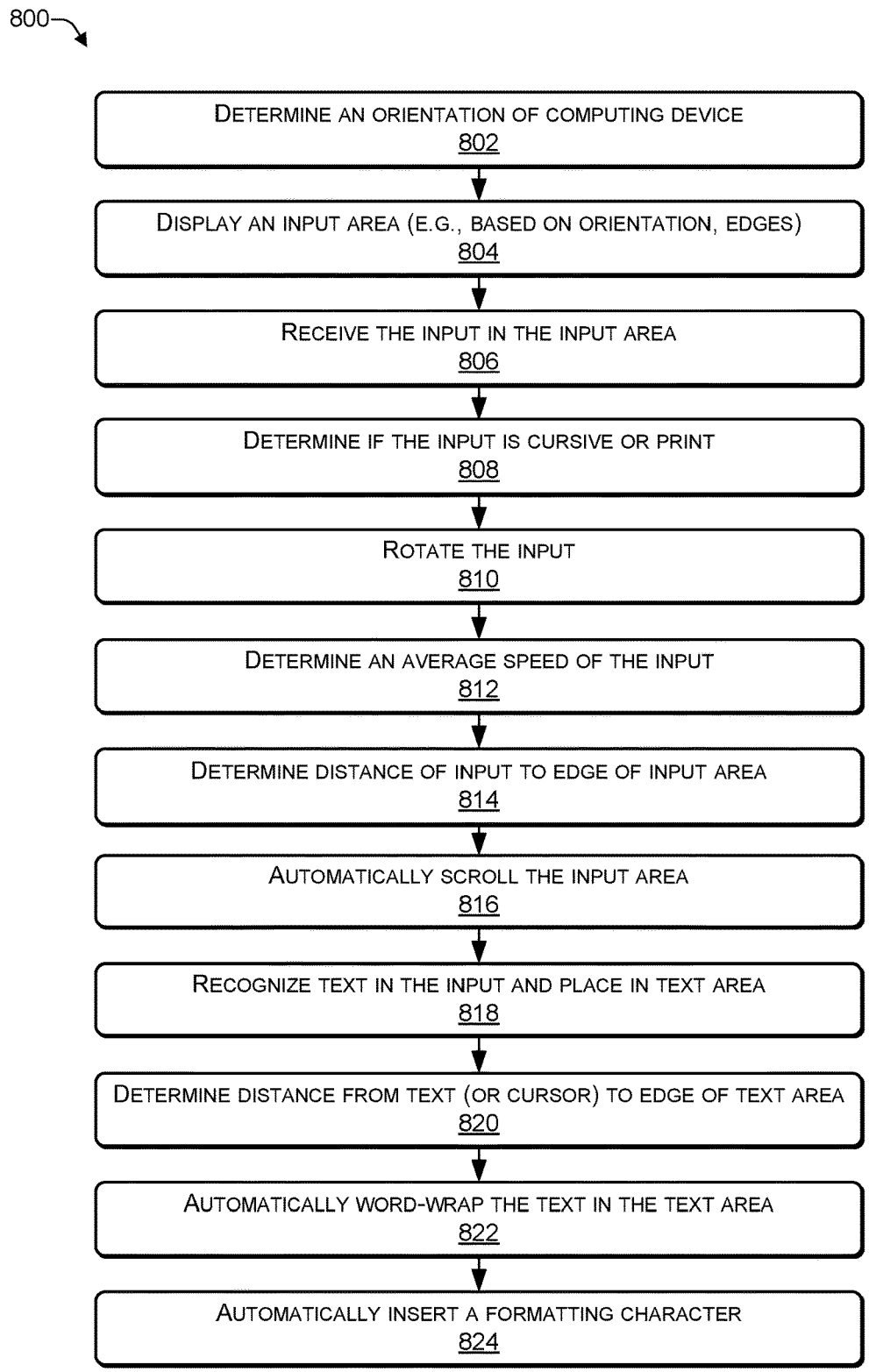
FIG. 8 is a flowchart of a process that includes determining an orientation of a dual-display computing device according to some embodiments.

In the flow diagrams of FIGS. 8 and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 800 and 900 are described with reference to FIG. 1, 2, 3, 4, 5, 6, or 7 as described above, although other models, frameworks, systems and environments may be used to implement these processes.

FIG. 8 is a flowchart of a process 800 that includes automatically scrolling an input area of a dual-display computing device according to some embodiments. For example, the process may be performed by one or more components, such as an auto-scroll module, of the computing device 102 of FIGS. 1 and 2. The operating system of the computing device 102 may enable the user to specify whether input is provided using a keyboard or using the touchscreen display device. A user may specify that the user desires to provide input by writing (e.g., using a stylus) on the touchscreen display device of the computing device (e.g., rather than using a keyboard).

At 802, an orientation of the computing device may be determined. For example, in FIG. 1, a component (e.g., auto-scroll module) of the computing device 102 may determine an orientation of the computing device 102. The component of the computing device 102 may determine that the orientation is one of the orientations described in FIGS. 5, 6, and 7. For example, the component may determine that the computing device 102 is in the vertical dual-display orientation 606(1) in FIG. 1 or in the horizontal orientation 504 in FIG. 2.

At 804, an input area may be created and displayed. For example, in FIG. 1, the input area 110 may be displayed based on determining that stylus input is to be received and based on the orientation of the computing device 102. In some cases, the computing device 102 may display the input area 110 based partly on the front edge 112, the back edge 114, or both. For example, the front edge 112 may determine a location of the rightmost edge of the input area 110. The back edge 114 may determine a location of the leftmost edge of the input area 110.

At 806, input may be received in the input area. For example, in FIG. 1 or 2, the input area 110 may receive the input 130 (e.g., from the stylus 506) that is being manipulated by a user.

At 808, a determination may be made whether the input is cursive or print. For example, in FIG. 1, after receiving the input 130 in the input area 110, the computing device 102 may determine whether the input 130 is in a printed format, a cursive format, or a combination of printed and cursive.

At 812, the input may be rotated. For example, in FIG. 1, the input 130 in the input area 110 may be at an angle (e.g., imprecisely aligned with the vertical or horizontal edges of the display devices 104, 106). To illustrate, the word "quick" may not be parallel to the bottom edge of the first display device 104 (or perpendicular to the bottom edge of the first display device 104. The computing device 102 may automatically rotate (e.g., between 0 and 90 degrees clockwise or counterclockwise) the word "quick" received in the input 130 to position the word "quick" approximately parallel to the bottom of the first display device 104.

At 812, an average speed of the input may be determined. For example, in FIG. 1, the computing device 102 may determine an average speed in which the input 130 is being received in the input area 110. The average speed may be the average number of characters per second that are being input. The average speed may be determined based on an average size of each character that is being entered, a total number of characters entered, a previously determined average speed associated with a particular user, a running total, or any combination thereof. For example, the running total may be an average speed of the last N number of characters that have been input into the input area 110 (e.g., where N>1).

At 814, a distance between the input and an edge of the input area may be determined. For example, in FIG. 1, the component may determine a distance between a rightmost character of the input 130 and a rightmost edge of the input area 110.

At 816, the input area may be automatically scrolled. For example, in FIG. 1, as one or more characters are entered into the input area 110, the auto-scroll module may determine whether to initiate automatically scrolling the input area at a rate (e.g., number of characters or words per second) that is based on the average speed at which the input 130 is being received, an average size of the characters being received in the input 130, whether the input 130 includes cursive input or printed input, a distance of a rightmost portion of the input 130 from an edge of the input area 110, and the like. When the input area 110 is being automatically scrolled, at least a portion (e.g., one or more characters or one or more words) may be removed from being displayed the input area 110 (e.g., as described in more detail in FIG. 3, FIG. 4, and FIG. 9). Automatically scrolling the input area 110 may enable the user to continuously provide stylus input, without having to stop to manually scroll the input area 110.

At 818, the input may be converted into text and placed in the text area. For example, in FIG. 1, at least a portion of the input 130 provided in the input area 110 may be converted into text (e.g., using OCR or a similar technique) and inserted into the text area 118.

At 820, a determination may be made as to a distance between the text or the cursor and an edge of the text area. At 822, text in the text area may be automatically word-wrapped. For example, in FIGS. 3 and 4, in response to determining that the text in the text area 118 (or the cursor 124) is within a predetermined distance from an edge of the text area 118, the computing device 102 may automatically perform the word-wrap 122 of the text in the text area 118.

At 824, a formatting character may be automatically inserted by the computing device. For example, the computing device 102 may automatically insert a formatting character (e.g., carriage return, new paragraph, indent, bulleted list, numbered list, or the like) in response to detecting that the input includes a particular symbol or character that the user has previously defined as equivalent to the formatting character.

Thus, an auto-scroll module of a computing device may create an input area to receive stylus input based on an orientation of the computing device. As stylus input is being received in the input area, the auto-scroll module may automatically scroll the input area based on whether the input is cursive or printed, an average speed of the stylus input, and an average size of the characters that are being input. The auto-scroll module may determine whether one or more of the input characters are at an angle and rotate the input characters to be approximately parallel to a bottom edge of one of the display devices (e.g., the display device that is facing the user). As input is automatically scrolled from the input area, the corresponding text may be inserted into a text area of an application executing on the computing device. Based on a distance of a last character of the text (or a cursor) from an edge of the text area, the text in the text area may be word-wrapped. If the user has pre-defined a particular symbol or character, the auto-scroll module may enter a formatting character, such as a carriage return, in response to the user entering the particular symbol or character in the input area. In this way, the automatic scrolling may enable a user to continuously provide stylus input without having to pause to manually scroll the input area.

FIG. 9 is a flowchart of a process 900 that includes performing optical character recognition (OCR) on input according to some embodiments. The process 900 may be performed by a component, such as an auto-scroll module, of the computer device 102 of FIG. 1.

At 902, a portion of input being displayed in an input area may be removed (e.g., may no longer be displayed). For example, in FIG. 3, after one or more characters have been entered into the input area 110, at least a portion of the characters in the input area 110 may be removed from being displayed in the input area 110. The portion of the characters that are removed from being displayed the input area 110 may include all of the characters that were input in the input area 110 or less than all of the characters that were input in the input area 110.

At 904, text in the portion that was removed may be recognized. For example, in FIG. 3, after the user enters the input "the" into the input area 110, the computing device 102 may recognize (e.g., using OCR or a similar technique) the corresponding text in the input 130 as the characters "the".

At 908, the text may be inserted (e.g., displayed) in a text area of an application. For example, in FIG. 3, as the user completes entering one or more characters into the input area 110, the text may be recognized (e.g. using OCR) and the corresponding text inserted into the text area 118 (e.g., at or near the location of the cursor 124).

At 910, a location where a remaining portion of the input is being displayed in the input area may be modified. For example, in FIG. 1, after a portion of the input 130 has been removed from being displayed in the input area 110, a remaining portion of the input 130 may be moved. To illustrate, the user may enter "the quick brown fox" into the input area 110 and then begin entering "jumps over the lazy dog" into the input area 110. The computing device 102 may remove "the quick brown fox" from being displayed in the input area 110. After the user completes entering "jumps over the lazy dog." into the input area 110, the computing device 102 may automatically move the location of "jumps over the lazy dog" from the second display device 106 to the first display device 104 to enable the user to continue providing the input 130 into the portion of the input area 110 that is located on the second display device 106. For example, when a rightmost portion of the input 130 is within a predetermined distance from the rightmost edge of the input area 110 (or the front edge 112), the computing device 102 may automatically scroll the input area 110 by removing and recognizing text in the portion of the input area 110 being displayed on the first display device 110 and moving the remaining portion of the input area 110 (e.g., being displayed on the second display device 112) to be displayed on the first display device 110. In this way, the user may continue to provide input in the input area 110 located on the second display device 106 and the input 130 may be continuously and automatically scrolled from the input area 110 displayed on the second display device 106 to the input area 110 displayed on the first display device 104.

Thus, when automatically scrolling input received in an input area, at least a portion of input received in the input area may be removed from the input area. OCR (or another character recognition technique) may be used on the removed portion of the input to identify text. The identified text may be inserted into a text area of a window of an application. In this way, the automatic scrolling may enable a user to continuously provide stylus input without pausing to manually scroll the input area.

Figure 10:
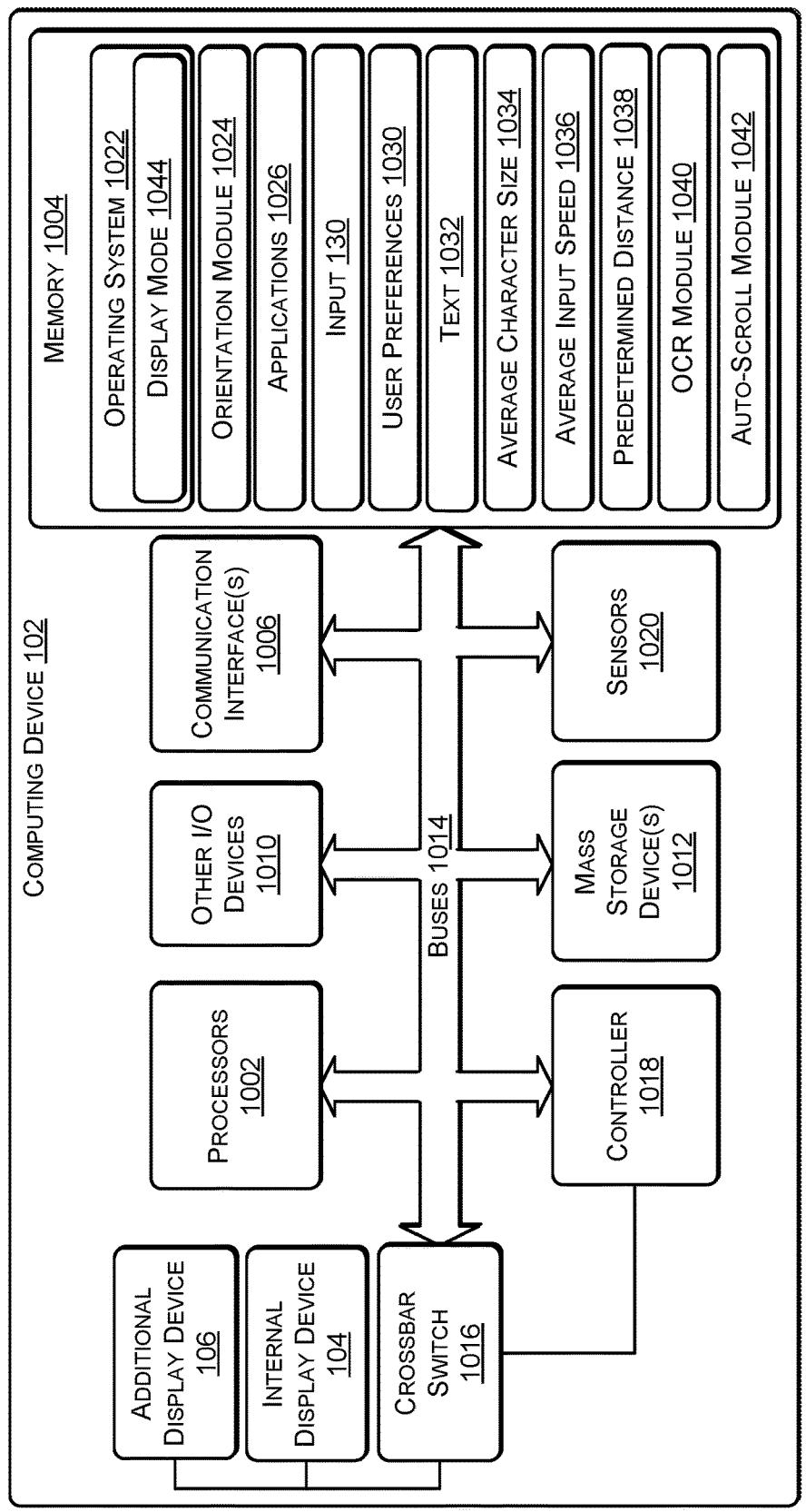
FIG. 10 illustrates an example configuration of a computing device that can be used to implement the systems and techniques described herein.

FIG. 10 illustrates an example configuration of the computing device 102 of FIGS. 1 and 2 that can be used to implement the systems and techniques described herein. The computing device 102 may include one or more processors 1002 (e.g., the CPU 106 and the GPU 104 of FIG. 1), memory 1004, communication interfaces 1006, the display devices 104 and 106, other input/output (I/O) devices 1010 (e.g., the stylus 506), and one or more mass storage devices 1012, configured to communicate with each other, such as via one or more system buses 1014 or other suitable connection. While a single bus is illustrated for ease of understanding, it should be understood that the system buses 1014 may include multiple buses, such as memory device buses, storage device buses, power buses, video signal buses, and the like.

The processors 1002 are one or more hardware devices that may include a single processing unit or a number of processing units, all of which may include single or multiple computing units or multiple cores. The processors 1002 may include an integrated GPU or the GPU a separate processor device. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 1004, mass storage devices 1012, or other computer-readable media.

Memory 1004 and mass storage devices 1012 are examples of non-transitory computer media (e.g., memory storage devices) for storing instructions that can be executed by the processors 1002 to perform the various functions described herein. For example, memory 1004 may include both volatile memory and non-volatile memory (e.g., RAM, ROM, or the like) devices. Further, mass storage devices 1012 may include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein, and may be a media capable of storing computer-readable, processor-executable program instructions as computer program code that can be executed by the processor 1002 as a particular machine configured for carrying out the operations and functions described in the implementations herein.

The computing device 102 may also include one or more communication interfaces 1006 for exchanging data via a network with other computing devices. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1006 can also provide communication with external storage (not shown), such as in a storage array, network attached storage, storage area network, or the like. The display devices 104, 106 may be connected to each other using a hinge (e.g., the hinge 108 of FIG. 1) that enables each display device to rotate relative to the other display device. The display devices 104, 106 may be used for displaying information and images to users. Other I/O devices 1010 may be devices that receive various inputs from a user and provide various outputs to the user, and may include the stylus 506, a keyboard, a remote controller, a mouse, a printer, audio input/output devices, and so forth. A controller 1018 may select a particular routing configuration of a crossbar switch 1016. For example, the routings may select whether an output of an embedded DisplayPort (eDP) is sent to one or both display devices 104, 106 and whether an output of a DisplayPort (DP) is sent to one or both display devices 104, 106. The computing device 102 may include one or more sensors 1020, such as, for example, an accelerometer, a gyroscope, a magnetometer or a magnetic compass, a proximity sensor, a camera, or another type of sensor.

The computer storage media, such as memory 1004 and mass storage devices 1012, may be used to store software and data. For example, the computer storage media may be used to store an operating system 1022, an orientation module 1028 to determine an orientation of the computing device 102, one or more software applications 1026, the input 130, user preferences 1030 (e.g., including predefined symbols or characters), text 1032 that is placed in the text area 110, an average character size 1034 of at least a portion of the input 130, an average input speed 1036 of the input 130, a predetermined distance 1038 to determine when to word-wrap the text 1032 in the text area 110, an OCR module 1040 to recognize text in the input 130, and an auto-scroll module 1042 to perform at least a portion of the processes and techniques described herein. The operating system 1022 may have an associated display mode 1044. For example, the operating system 132, such as Microsoft® Windows®, may provide three display modes 1044: (a) extended desktop mode where the display devices 104, 106 behave as a single display device, (b) clone mode where each of the display devices 104, 106 display the same content, or (c) single display mode, e.g., one of the display devices 104, 106 is off or blank and therefore not displaying any content.

The auto-scroll module 1042 may create the input area 110 to receive input from the stylus 506 based on an orientation of the computing device 102. As the input 130 is being received in the input area 110, the auto-scroll module 1042 may automatically scroll the input area 110 based on whether the input 130 is cursive or printed, the average input speed 1036 of the stylus input, and the average character size 1034 of the characters that are being input. The auto-scroll module 1042 may determine whether one or more of the characters in the input 130 are at an angle and rotate the input characters to be approximately parallel to a bottom edge of one of the display devices 104, 106. As the input 130 is automatically scrolled from the input area 110, the corresponding text 1032 may be inserted into the text area 118 of one of the applications 1026 executing on the computing device 102. Based on a distance of a last character of the text (or a cursor) from an edge of the text area 118, the text 1032 in the text area 118 may be word-wrapped. If the user has pre-defined a particular symbol or character stored in the user preferences 1030, the auto-scroll module 1042 may enter a formatting character, such as a carriage return, in response to the user entering the particular symbol or character in the input area. In this way, the automatic scrolling may enable a user to continuously provide stylus input without having to pause to manually scroll the input area.

Figure 11:
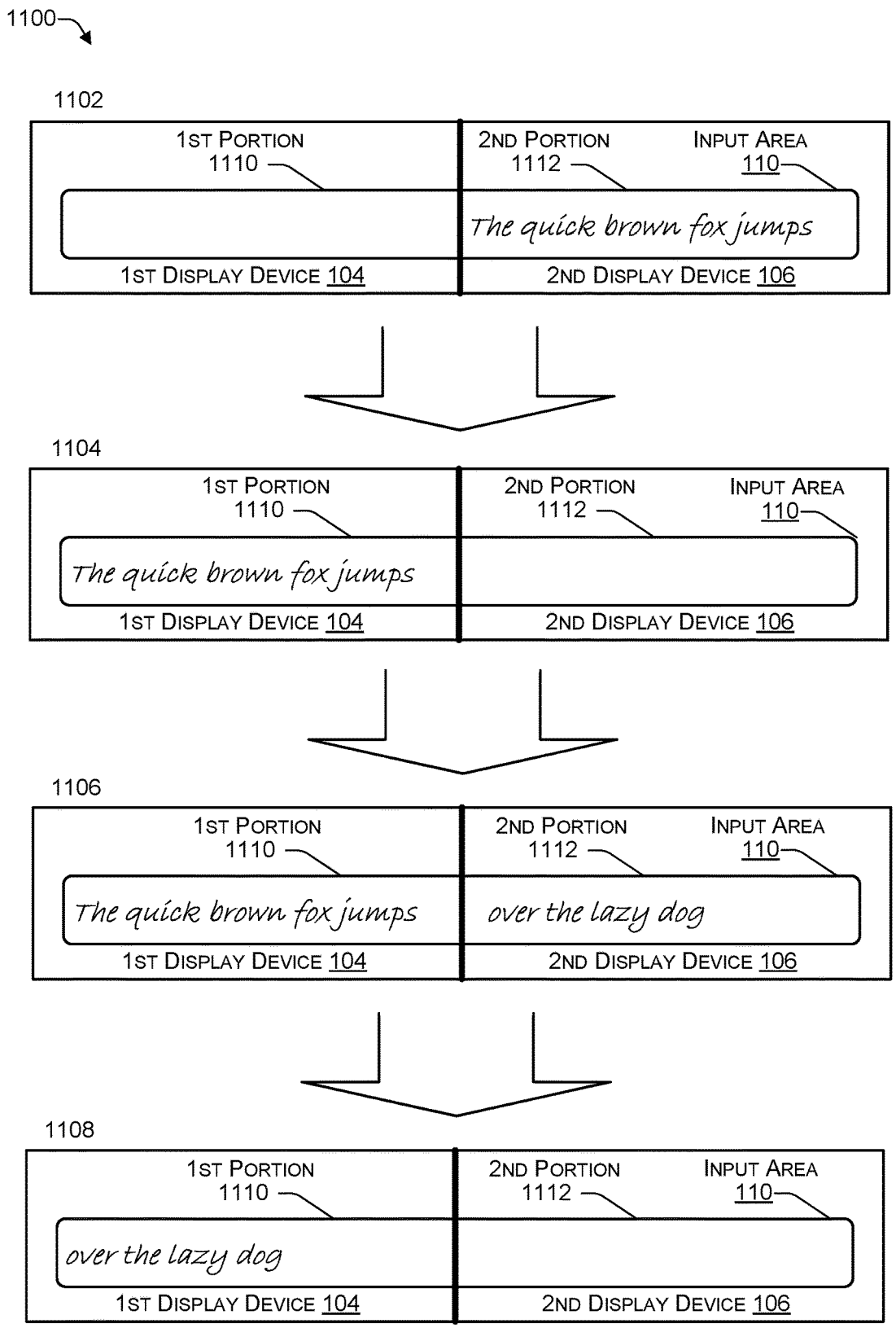
FIG. 11 is a block diagram illustrating automatic scrolling from one display device to another display device according to some embodiments.

FIG. 11 is a block diagram 1100 illustrating automatic scrolling from one display device to another display device according to some embodiments. A first portion 1110 of the input area 110 may be displayed on the first display device 104 and a second (e.g., remaining) portion 1112 of the input area 110 may be displayed on the second display device 106. The user may provide input into one of the portions 1110, 1112 and the computing device 102 may automatically scroll the input to the other of the portions 1110, 1112. For example, at 1102, the user may enter "the quick brown fox jumps" into the second portion 1112 of the input area 110. At 1104, the computing device 102 may automatically scroll the second portion 1112 of the input area 110 by removing "the quick brown fox jumps" from the second portion 1112 on the second display device 106 and displaying "the quick brown fox jumps" in the first portion 1110 on the first display device 104. At 1106, the user may enter "over the lazy dog." into the second portion 1112 of the input area 110. At 1108, the computing device 102 may automatically scroll the "over the lazy dog" from the second display device 106 to the first display device 104 to enable the user to continue providing the input 130 into the second portion 1112 of the input area 110 that is located on the second display device 106. For example, when a rightmost portion of the input 130 is within a predetermined distance from the rightmost edge of the input area 110 (or the front edge 112), the computing device 102 may automatically scroll the input area 110 by removing and recognizing text in the first portion 1110 of the input area 110 being displayed on the first display device 110 and moving the second (e.g., remaining) portion 1112 of the input area 110 (e.g., being displayed on the second display device 112) to be displayed on the first display device 110. In this way, the user may continue to provide input in the input area 110 located on the second display device 106 and the input 130 may be continuously and automatically scrolled from the second portion 1112 of the input area 110 displayed on the second display device 106 to the first portion 1110 of the input area 110 displayed on the first display device 104.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by a computing device comprising a first display device and a second display device, an orientation of the computing device, wherein the first display device and the second display device each comprise a touchscreen display device;
   receiving, by the computing device, user input specifying a front edge of an input area;
   creating, by the computing device and based at least in part on the user input, the input area, wherein a first portion of the input area is displayed on the first display device and a second portion of the input area is displayed on the second display device, and wherein a rightmost edge of the input area is located approximately at a location of the front edge;
   receiving, by the computing device, stylus input in the second portion of the input area;
   determining, by the computing device, an average size of each character of the stylus input;
   determining, by the computing device, an average speed of the stylus input based at least in part on the average size of each character of the stylus input;
   moving, based at least in part on the average speed of the stylus input, at least a portion of the stylus input received in the second portion of the input area to the first portion of the input area, wherein the portion of the stylus input is moved:
      left, when the second portion is located to the left of the first portion;
      right, when the second portion is located to the right of the first portion;
      above, when the second portion is located above the first portion; or
      below, when the second portion is located below the first portion;
   recognizing text in the portion of the stylus input that was removed;
   displaying the text in a text area of a window of an application being displayed on at least one of the first display device or the second display device; and
   automatically inserting a carriage return into the text area based at least in part on determining that the stylus input includes a predefined symbol associated with a carriage return.

2. The method of claim 1, wherein:
   the orientation of the computing device comprises a vertical dual-display orientation; and
   the input area spans both the first display device and the second display device.

3. The method of claim 1, further comprising:
   determining that the text is within a predetermined distance from an edge of the text area; and
   automatically word-wrapping the text in the text area.

4. The method of claim 1, further comprising:
   determining that the stylus input comprises printed input;
   determining that the portion of the stylus input comprises at least one character; and
   automatically moving the portion of the stylus input received in the second portion of the input area to the first portion of the input area based at least in part on the at least one character.

5. The method of claim 1, further comprising:
   determining that the stylus input comprises cursive input;
   determining that the portion of the stylus input comprises one or more words; and
   automatically moving the portion of the stylus input received in the second portion of the input area to the first portion of the input area based at least in part on the one or more words.

6. The method of claim 1,
   wherein the orientation of the computing device comprises one of:
      a vertical dual-display orientation;
      a book orientation;
      a vertical tablet orientation;
      a tent orientation;
      a presentation orientation;
      a horizontal tablet orientation; or
      a clamshell orientation.

7. The method of claim 1, further comprising:
   determining that the portion of the stylus input is at an angle relative to a horizontal edge of at least one of the first display device or the second display device; and
   rotating the portion of the stylus input to be approximately parallel to the horizontal edge of at least one of the first display device or the second display device.

8. A computing device comprising:
   a first touchscreen display device;
   a second touchscreen display device;
   one or more processors;
   one or more non-transitory computer-readable media storing instructions executable by the one or more processors to perform operations comprising:
      determining an orientation of the computing device;
      displaying an input area on at least one of the first touchscreen display device or the second touchscreen display device;
      receiving user input specifying a front edge of an input area;
      creating, based at least in part on the user input, the input area, wherein:
         a first portion of the input area is displayed on the first touchscreen display device;
         a second portion of the input area is displayed on the second touchscreen display device; and
         a rightmost edge of the input area is located approximately at a location of the front edge;
      receiving stylus input in the second portion of the input area;
      determining an average size of each character of the stylus input;
      determining an average speed of the stylus input based at least in part on the average size of each character of the stylus input;
      moving, based at least in part on the average speed of the stylus input, at least a portion of the stylus input received in the second portion of the input area to the first portion of the input area, wherein the portion of the stylus input is moved:
         left, when the second portion is located to the left of the first portion;
         right, when the second portion is located to the right of the first portion;
         above, when the second portion is located above the first portion; or
         below, when the second portion is located below the first portion;
      recognizing text in the portion of the stylus input that was removed;

displaying the text in a text area of a window of an application being displayed on at least one of the first touchscreen display device or the second touchscreen display device; and automatically inserting a carriage return into a text area based at least in part on determining that the stylus input includes a predefined symbol associated with a carriage return.

9. The computing device of claim 8, wherein:
the orientation of the computing device comprises a vertical dual-display orientation; and
the input area spans both the first touchscreen display device and the second touchscreen display device.

10. The computing device of claim 8, further comprising:
determining that a cursor displayed in the text area is within a predetermined distance from a rightmost edge of the text area; and
automatically word-wrapping the text in the text area.

11. The computing device of claim 8, wherein the orientation of the computing device comprises one of a vertical dual-display orientation, a book orientation, a vertical tablet orientation, a tent orientation, a presentation orientation, a horizontal tablet orientation, or a clamshell orientation.

12. The computing device of claim 8, the operations further comprising:
determining that the stylus input comprises printed input;
determining an average size of each character of the stylus input; and
determining an average speed of the stylus input based at least in part on the average size of each character of the stylus input.

13. The computing device of claim 8, the operations further comprising:
determining an average speed of the stylus input, the average speed comprising at least one of an average number of characters entered in the input area per second or an average number of words entered in the input area per second; and
automatically scrolling the input area based at least in part on the average speed of the stylus input.

14. One or more non-transitory computer-readable media storing instructions that are executable by one or more processors to perform operations comprising:
determining an orientation of a computing device comprising a first touchscreen display device and a second touchscreen display device;
receiving user input specifying a front edge of an input area;
creating, based at least in part on the user input, the input area, wherein a first portion of the input area is displayed on the first touchscreen display device and a second portion of the input area is displayed on the second touchscreen display device, and wherein a rightmost edge of the input area is located approximately at a location of the front edge;
receiving, by the computing device, stylus input in the second portion of the input area;
determining an average size of each character of the stylus input;
determining an average speed of the stylus input based at least in part on the average size of each character of the stylus input;
moving, based at least in part on the average speed of the stylus input, at least a portion of the stylus input received in the second portion of the input area to the first portion of the input area, wherein the portion of the stylus input is moved:
left, when the second portion is located to the left of the first portion;
right, when the second portion is located to the right of the first portion;
above, when the second portion is located above the first portion; or
below, when the second portion is located below the first portion;
recognizing text in the portion of the stylus input that was removed;
displaying the text in a text area of a window of an application being displayed on at least one of the first touchscreen display device or the second touchscreen display device; and
automatically inserting a carriage return into the text area based at least in part on determining that the stylus input includes a predefined symbol associated with a carriage return.

15. The one or more non-transitory computer-readable media of claim 14 wherein:
the orientation of the computing device comprises a vertical dual-display orientation;
the input area spans both the first touchscreen display device and the second touchscreen display device; and
input received in the portion of the input area displayed on the second touchscreen display device is automatically moved to a remaining portion of the input area displayed on the first touchscreen display device.

16. The one or more non-transitory computer-readable media of claim 14, further comprising:
determining that additional input in the input area does not include text; and
stopping automatically scrolling the input area.

17. The one or more non-transitory computer-readable media of claim 14, further comprising:
determining that a cursor displayed in the text area is within a predetermined distance from a rightmost edge of the text area; and
automatically word-wrapping the text in the text area.

18. The one or more non-transitory computer-readable media of claim 14, wherein a single organic light emitting diode panel (OLED) is folded to create the first touchscreen display device and the second touchscreen display device.

19. The one or more non-transitory computer-readable media of claim 18, wherein automatically scrolling the input area based at least in part on the stylus input comprises at least one of:
scrolling in a first direction that is approximately parallel to a horizontal edge of at least one of the first touchscreen display device or the second touchscreen display device; or
scrolling in a second direction that is approximately perpendicular to the horizontal edge.

20. The one or more non-transitory computer-readable media of claim 14, wherein:
a hinge attaches the first touchscreen display device to the second touchscreen display device, the hinge enabling the first touchscreen display device to rotate between approximately zero degrees and approximately three hundred and sixty degrees relative to the second touchscreen display device.

* * * * *